United States Patent
Kimura et al.

(10) Patent No.: US 11,907,627 B2
(45) Date of Patent: Feb. 20, 2024

(54) FABRICATED LAYOUT CORRELATION

(71) Applicant: Battelle Memorial Institute, Columbus, OH (US)

(72) Inventors: Adam Kimura, Lewis Center, OH (US); Rohan Prabhu, Dublin, OH (US); Noah Mun, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 237 days.

(21) Appl. No.: 17/545,572

(22) Filed: Dec. 8, 2021

(65) Prior Publication Data
US 2022/0188491 A1    Jun. 16, 2022

Related U.S. Application Data

(60) Provisional application No. 63/125,426, filed on Dec. 15, 2020.

(51) Int. Cl.
*G06F 30/327* (2020.01)
*G06F 30/392* (2020.01)
(Continued)

(52) U.S. Cl.
CPC .......... *G06F 30/327* (2020.01); *G06F 30/333* (2020.01); *G06F 30/392* (2020.01);
(Continued)

(58) Field of Classification Search
CPC .... G06F 30/327; G06F 30/392; G06F 30/333; G06F 30/27; G06F 30/3308;
(Continued)

(56) References Cited

U.S. PATENT DOCUMENTS

| | | | | |
|---|---|---|---|---|
| 2006/0045325 A1* | 3/2006 | Zavadsky | ............... | G06T 7/74 382/209 |
| 2006/0131609 A1* | 6/2006 | Kinoshita | ............... | G06F 30/39 257/202 |

(Continued)

FOREIGN PATENT DOCUMENTS

| | | | | |
|---|---|---|---|---|
| JP | 03159252 A | * | 7/1991 | |
| JP | 2013130582 A | * | 7/2013 | ......... G01N 21/9501 |

(Continued)

OTHER PUBLICATIONS

Bernhard Lippmann, et al, "Verification of physical designs using an integrated reverse engineering flow for nanoscale technologies" Integration, the VLSI Journal vol. 17 Nov. 29, 2020.
(Continued)

*Primary Examiner* — Phallaka Kik
(74) *Attorney, Agent, or Firm* — Lippes Mathias LLP (57) ABSTRACT

In an integrated circuit (IC) assessment method, an artificial intelligence (AI) component comprising at least one artificial neural network (ANN) is trained to transform layout rendering tiles of a rendering of a reference IC into corresponding reference layout image tiles extracted from at least one layout image of the reference IC. Using the trained AI component, standard cell layout renderings of a library of GDSII or OASIS standard cell layout renderings are transformed into as-fabricated standard cell layout renderings forming a library of as fabricated standard cell layout renderings. Instantiated standard cells and their placements in the layout image of an IC-under-test are identified by matching the instantiated standard cells with corresponding as-fabricated standard cell layout renderings retrieved from the library of as fabricated standard cell layout renderings.

19 Claims, 6 Drawing Sheets

(51) Int. Cl.
*G06F 30/333* (2020.01)
*G06F 30/27* (2020.01)
*G06F 30/3308* (2020.01)
*G06F 30/367* (2020.01)
*G06F 30/398* (2020.01)
*G06N 3/08* (2023.01)
*G06F 119/18* (2020.01)

(52) U.S. Cl.
CPC .............. *G06N 3/08* (2013.01); *G06F 30/27* (2020.01); *G06F 30/3308* (2020.01); *G06F 30/367* (2020.01); *G06F 30/398* (2020.01); *G06F 2119/18* (2020.01)

(58) Field of Classification Search
CPC .. G06F 30/367; G06F 30/398; G06F 2119/18; G06N 3/08; G06T 2207/2008; G06T 70/00; G06T 70/0006
USPC ...... 716/51, 136, 111; 706/12, 45, 900, 920; 714/732, 741; 382/145, 154, 159, 190, 382/209; 703/14
See application file for complete search history.

(56) References Cited

U.S. PATENT DOCUMENTS

| | | | | |
|---|---|---|---|---|
| 2010/0192112 A1* | 7/2010 | Nakazato | ........... | G01R 31/2656 716/112 |
| 2010/0306719 A1* | 12/2010 | Smayling | ............. | G06F 30/398 716/136 |
| 2010/0325593 A1* | 12/2010 | Zavadsky | ............... | G06F 30/33 716/111 |
| 2013/0163851 A1* | 6/2013 | Dalla-Torre | ............ | G06T 7/001 382/149 |
| 2016/0117412 A1* | 4/2016 | Mungi | .................. | G06F 40/151 707/774 |
| 2017/0074927 A1* | 3/2017 | Gignac | ................ | G01R 31/307 |
| 2017/0177997 A1* | 6/2017 | Karlinsky | ............ | G06V 10/993 |
| 2017/0316557 A1* | 11/2017 | Inoue | ....................... | G06T 7/001 |
| 2020/0294659 A1* | 9/2020 | Gopinath | ............. | A61B 5/0084 |
| 2020/0388033 A1* | 12/2020 | Matlock | ............... | G06V 20/698 |

FOREIGN PATENT DOCUMENTS

| | | | | |
|---|---|---|---|---|
| JP | 2013257304 A | * | 12/2013 | ............. G06T 7/001 |
| JP | 2017058190 A | * | 3/2017 | |
| TW | 201732690 A | * | 9/2017 | ............. G06K 9/036 |

OTHER PUBLICATIONS

Raul Quijada, et al, "Large-Area Automated Layout Extraction Methodology for Full-IC Reverse Engineering" Journal of Hardware and Systems Security Oct. 31, 2018.
International Search Report for PCT Application Serial No. PCT/US2021/062368 dated Apr. 4, 2022.

* cited by examiner

FABRICATED LAYOUT CORRELATION

CROSS-REFERENCE TO RELATED APPLICATIONS

This application claims the benefit of U.S. Provisional Application No. 63/125,426 filed Dec. 15, 2020 titled "DESIGN TO FABRICATED LAYOUT CORRELATION". U.S. Provisional Application No. 63/125,426 filed Dec. 15, 2020 titled "DESIGN TO FABRICATED LAYOUT CORRELATION" is incorporated herein by reference in its entirety.

STATEMENT REGARDING FEDERALLY SPONSORED RESEARCH OR DEVELOPMENT

This invention was made with government support under contract number FA8650-17-F-1047 awarded by Air Force Research Laboratory (AFRL). The government has certain rights in the invention.

BACKGROUND

The following relates to the integrated circuit (IC) assessment arts, IC verification arts, IC validation arts, IC obsolescence remediation arts, and the like.

IC verification or validation processes provide assurance that outsourced IC components are acceptable for use in critical systems. These processes can ensure that IC suppliers are meeting IC design specifications, can detect counterfeiting, surreptitious incorporation of malicious features, or so forth. However, the very high complexity of modern IC components makes accurate and reliable IC verification/validation a challenging task.

Certain improvements are disclosed herein.

BRIEF SUMMARY

In accordance with some illustrative embodiments disclosed herein, an integrated circuit (IC) assessment device is disclosed for assessing an IC-under-test. The IC assessment device comprises an electronic processor, and a non-transitory storage medium storing: a library of as-fabricated standard cell layout renderings constructed using at least one reference layout image acquired of a reference IC; and instructions readable and executable by the electronic processor to perform an IC assessment method including identifying instantiated standard cells and their placements in the layout image of the IC-under-test by matching the instantiated standard cells with corresponding as-fabricated standard cell layout renderings retrieved from the library of as-fabricated standard cell layout renderings. In some embodiments, the non-transitory storage medium further stores instructions readable and executable by the electronic processor to perform a method of constructing the library of as-fabricated standard cell layout renderings. This method suitably includes: training an artificial intelligence (AI) component comprising at least one artificial neural network (ANN) to transform layout rendering tiles of a layout rendering of a reference IC into corresponding reference layout image tiles extracted from at least one layout image of the reference IC; and using the trained AI component, transforming standard cell layout renderings of a library of standard cell layout renderings into the as-fabricated standard cell layout renderings forming the library of as-fabricated standard cell layout renderings.

In accordance with some illustrative embodiments disclosed herein, a non-transitory storage medium stores instructions readable and executable by an electronic processor to perform a method of constructing a library of as-fabricated standard cell layout renderings. The method includes: training an AI component comprising at least one ANN to transform layout rendering tiles of a layout rendering of a reference IC into corresponding reference layout image tiles extracted from at least one layout image of the reference IC; and using the trained AI component, transforming standard cell layout renderings of a library of standard cell layout renderings into the as fabricated standard cell layout renderings forming the library of as fabricated standard cell layout renderings.

In accordance with some illustrative embodiments disclosed herein, an IC assessment method for assessing an IC under test includes: training an AI component comprising at least one ANN to transform layout rendering tiles of a GDSII or OASIS rendering of a reference IC into corresponding reference layout image tiles extracted from at least one layout image of the reference IC; using the trained AI component, transforming GDSII or OASIS standard cell layout renderings of a library of GDSII or OASIS standard cell layout renderings into as-fabricated standard cell layout renderings forming a library of as-fabricated standard cell layout renderings; and identifying instantiated standard cells and their placements in the layout image of the IC-under-test by matching the instantiated standard cells with corresponding as-fabricated standard cell layout renderings retrieved from the library of as-fabricated standard cell layout renderings.

BRIEF DESCRIPTION OF THE DRAWINGS

Any quantitative dimensions shown in the drawing are to be understood as non-limiting illustrative examples. Unless otherwise indicated, the drawings are not to scale; if any aspect of the drawings is indicated as being to scale, the illustrated scale is to be understood as non-limiting illustrative example.

DETAILED DESCRIPTION

In the design and fabrication of application-specific integrated circuits (ASICs), the standard cell methodology is commonly employed. In this approach, the functionality of the ASIC is initially designed using design tools that output a register-transfer level (RTL) representation such as Verilog or VHDL. The RTL description is converted into a netlist description of physically realizable components, called standard cells, and their logical interconnections. The library of standard cells is IC technology-dependent, and typically includes standard cells for logic gates (NAND, NOR, et cetera), flip-flops, adders, and so forth. The netlist identifies the standard cells that will make up the ASIC, and their electronic connections, but it does not specify the placement of these standard cells on the physical IC chip. Further steps in the ASIC design the physical placement of the standard cells on the area of the silicon wafer, and the physical routing of the electrical interconnects. The standard cell design approach advantageously enables efficient division of labor. For example, in a typical commercial workflow, a logic designer working for a company (or for a government, military, or the like) designs the ASIC at the RTL, synthesizes the design to the netlist level, and then conducts the place and route of the netlist gates and connectivity into the layout. The GDSII file format of the layout is then delivered to a semiconductor manufacturer who fabricates the design and delivers the ASIC components.

However, a difficulty arises with the lack of observability into the fabrication process at the foundry. The company receiving the delivery of ASIC components may be unwilling or unable to rely on the competence or trustworthiness of the semiconductor manufacturer in accurately fabricating the design as it was intended. Furthermore, in some settings, such as ASICs intended for use in military equipment or for sensitive data processing tasks, concerns about deliberate insertion of malicious features or added unknown functionality may be of concern. IC assessments for assurance verification can be performed to alleviate such concerns. The IC assessment reverse-engineers the fabricated design by recovering the exact placement of the standard cells on the silicon wafer and their respective physical interconnection and routing. The netlist and/or RTL representation can then be determined from the reverse-engineered placement and routing information.

In general, IC assessment entails acquiring images of the IC using a scanning electron microscope (SEM), optical microscope, or the like. In destructive assessment, delayering is performed in order to successively remove and image layers of the multilayer ASIC, and the layer images are then fused to form a three-dimensional (3D) representation of the ASIC, effectively recovering the original design stack up. The images are converted from pixels to vectors and design features such as metal traces, vias, et cetera are extracted. The delayering provides detailed information about the physical layout of the ASIC, enabling very comprehensive IC assessment.

The 3D or 2D image is then analyzed to identify the standard cells and their placements, along with the interconnects routing. In one approach, layout renderings of the standard cells in an industry-standard format such as GDSII or Open Artwork System Interchange Standard (OASIS) are matched to regions of the 3D or 2D image to identify the placed standard cells. However, there are significant challenges in such matching. The IC may include thousands, tens of thousands, or more standard cells, each of which may be placed at various orientations (e.g. rotated or flipped in various ways). Furthermore, the layout renderings to be matched are only rough approximations to the images of the as-fabricated standard cells. Differences can arise due to imaging artifacts in the 3D or 2D image of the IC (contrast, exposure, et cetera), but also because the fabrication process itself distorts the edges of the components and interconnects. Such distortions can result from various sources, such as optical diffraction effects during photolithography, and imperfections in the various deposition, etching, and other fabrication processes employed in the physical manufacture of the ASIC. Such as-fabricated cell distortions can be expected to vary significantly between different manufacturing processes, different semiconductor manufacturers, and between different layers of a given multilayer IC, and possibly even between different manufacturing batches of the same ASIC. To make the matching even more challenging, where the design description is at the RTL or netlist level, the IC assessment is provided with no a priori information about either cell placements or the physical interconnects routing. In a task such as IC obsolescence remediation, even the RTL or netlist descriptions may be unavailable.

Figure 1:
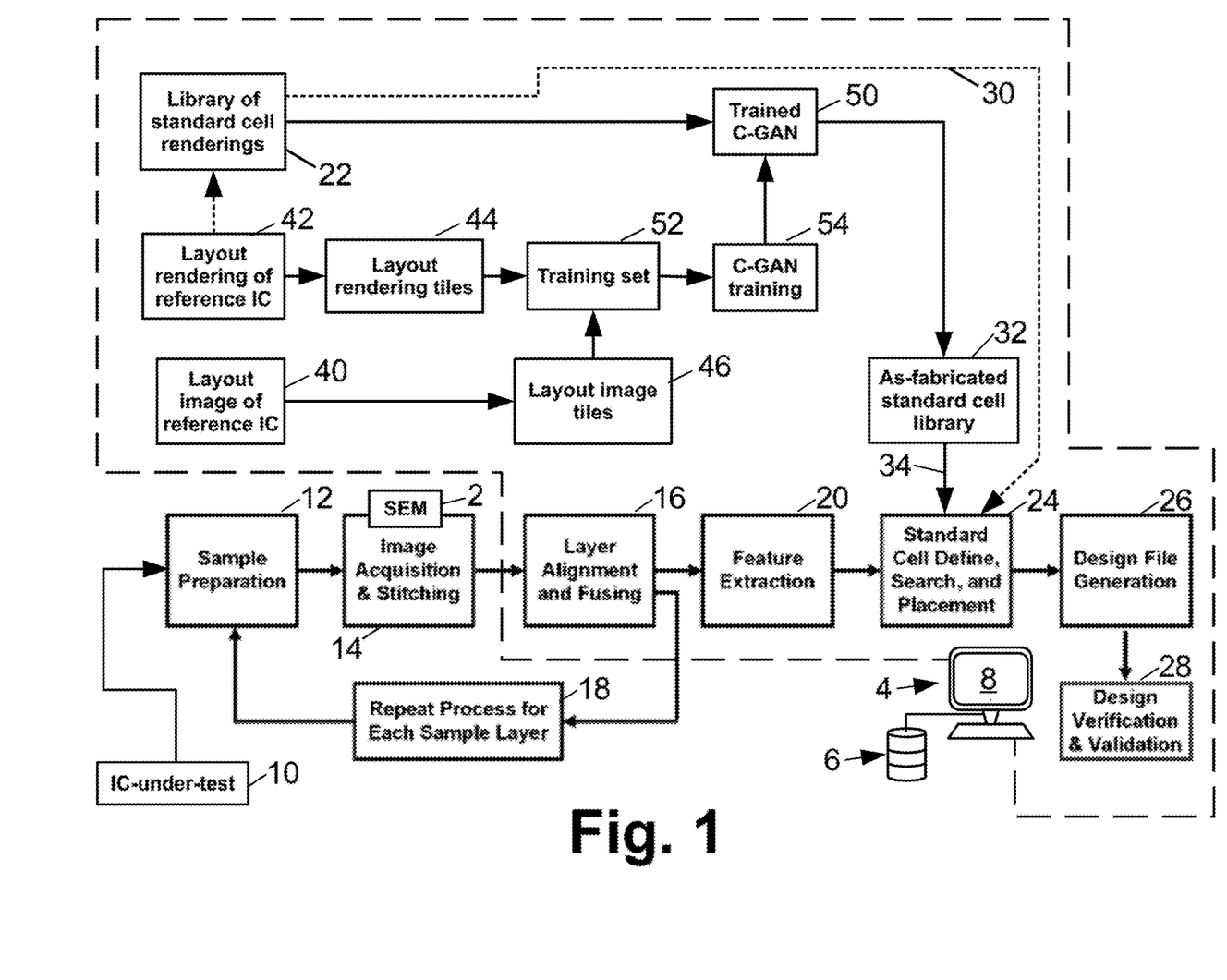
FIG. 1 diagrammatically shows an IC assessment system including generating an as-fabricated standard cell library for use in matching and placing components of the IC undergoing assessment.

With reference to FIG. 1, an illustrative IC assessment system includes a microscope 2, such as an illustrative scanning electron microscope (SEM) 2 or optical microscope, and a computer or other electronic processor 4 operatively connected with a non-transitory storage medium 6 that stores instructions that are readable and executable by the electronic processor 4 to perform IC assessment operations (and, in some embodiments, a method of constructing the library of as-fabricated standard cell renderings) as disclosed herein. The electronic processor 4 is suitably a desktop computer, server computer, cloud computing resource comprising a plurality of ad hoc connected server computers, various combinations thereof, or so forth. The non-transitory storage medium 6 can, by way of nonlimiting illustration, comprise a hard disk drive, RAID, or other magnetic storage medium, and/or an optical disk or other optical storage medium, and/or a solid-state drive (SSD) or other electronic storage medium, various combinations thereof, and/or so forth. The electronic processor 4 also includes or is operatively connected with at least one display 8 which may, for example, display layout images (or portions thereof) acquired by the microscope 2, graphical layout artwork renderings of a reference IC and/or of standard cells of a library of standard cells, netlists or other information generated by the IC assessment, and/or so forth.

The illustrative IC assessment of FIG. 1 is performed on an IC-under-test 10, and employs a destructive delayering process, which includes successive iterations of sample preparation 12, image acquisition 14 using the microscope 2, and layer alignment and fusing 16 performed by the electronic processor 4. In each iteration (possibly excepting the first), the sample preparation 12 includes a delayering step to remove one layer of the (typically multilayer) IC-under-test 10. Hence, the operations 12, 14, 16 are repeated 18 for each layer, and the images acquired at the successive iterations of the image acquisition 14 are layer images, which are stacked and fused in the operation 16 to generate the a layout image of the IC-under-test which comprises a three-dimensional (3D) layout image formed by stacking a plurality of layer images of the IC-under-test 10 acquired by the destructive delayering process.

In one nonlimiting illustrative example of the sample preparation processing 12, the die (i.e., the integrated circuit, or IC) is extracted from the IC packaging using 98% fuming nitric acid. The top metal layer is exposed by removing the polyimide, silicon nitride, and silicon oxide layers via reactive-ion etching (RIE) or another suitable removal process. Polyimide is suitably removed with an oxygen plasma with applied RF power. Silicon nitride and silicon oxide layers are suitably removed with a $CF_4/O_2$ plasma with applied RF power. Polysilicon can be removed with 49% hydrofluoric acid. These are merely illustrative examples, and other RIE, wet etching, or other material removal processing can be applied depending upon the composition(s) of the layer to be removed. A metal layer can be removed by selective wet etching, for example. Aluminum metal can be etched with 37% hydrochloric acid at room temperature. The preparation 12 may also include surface planarization by chemical-mechanical planarization (CMP) utilizing a dense, woven, low-nap silk pad and diamond suspension, or by another planarization technique. Such processing is performed for each iteration 18 to reveal the next layer of the multilayer IC-under-test 10 for imaging.

In one nonlimiting illustrative example of the image acquisition 14, after the target layer has been uniformly delayered to a satisfactory level, the sample is placed into a Scanning Electron Microscope (SEM) 2 and the full layer is imaged using a Backscatter Detector (BSD) or Secondary Electron Detector (SED) depending upon the material(s) being imaged and other factors. In one suitable acquisition sequence, the SEM 2 captures images of the target layer in a serpentine tile pattern which requires a stitching process to generate a full mosaic image of the target layer. Other imaging modalities are contemplated, such as light imaging using an optical microscope. A scanning imager is typically used to obtain sufficient lateral resolution of the layout, although a "one-shot" imager is contemplated if the field-of-view of the microscope is sufficiently larger with sufficient lateral spatial resolution.

The output of the operations 12, 14, 16, 18 is a 3D layout image of the IC-under-test 10, since it comprises the stacked-up layer images. It will be appreciated that this is a destructive delayering process in which the IC is destroyed. In some other embodiments (see, e.g. FIG. 6), the layout image of the IC-under-test 10 comprises a two-dimensional (2D) layout image acquired by a nondestructive process.

With the 3D (or 2D) layout image of the IC-under-test 10 obtained, the IC assessment next entails identifying instantiated standard cells and their placements in the 3D (or 2D) layout image of the IC-under-test. This assumes that the IC-under-test 10 was designed and fabricated in accordance with the standard cell methodology, so that the layout of the IC-under-test 10 is constructed as instantiated standard cells placed at specific locations in the layout, with metallization layers providing interconnectivity between the instantiated standard cells. One way the instantiated standard cells can be identified is to match the instantiated standard cells in the layout image of the IC-under-test with standard cell layout renderings of a library of standard cell layout renderings 22. The library 22 of standard cells may be specific to a particular IC fabrication technology (e.g. a set of standard cells for a CMOS fabrication technology, or for an NMOS fabrication technology, or so forth), or may be more specific to a particular IC fabrication foundry and/or a specific semiconductor manufacturer.

In one approach, standard cell layout renderings retrieved from the library of standard cell layout renderings 22 are matched directly to the layout image of the IC-under-test. However, this "rendering-to-image" can be computationally complex, since the image is typically a bitmap whereas the library of standard cell layout renderings 22 typically represents the standard cell layout renderings in a vector-based polygonal format such as GDSII or Open Artwork System Interchange Standard (OASIS).

Accordingly, in the embodiment of FIG. 1, to facilitate the matching, in an operation 20 the layout image of the IC-under-test 10 is converted to a layout rendering of the IC-under-test 10. This rendering is preferably in the same format as is used in the library of standard cell layout renderings 22, e.g. if the library of standard cell layout renderings 22 contains GSDII standard cell layout renderings then the operation 20 preferably also converts the layout image of the IC-under-test 10 to a GSDII layout rendering of the IC-under-test 10. To this end, in the operation 20 feature extraction is performed on the 3D (or 2D) layout image of the IC-under-test 10. In the extraction operation 20, design features such as the metals, vias, and polysilicon are extracted from the 3D (or 2D) layout image of the IC-under-test 10. This can be done using various image processing techniques, e.g. combinations of threshold, gaussian blur, and histogram equilibrium filters may be utilized in conjunction with a trained neural network to convert the stitched raster images into vector-based polygons. Once the polygons have been captured for the design, the layout design file (i.e., the layout rendering of the IC-under-test 10) can be generated in GDSII (if the library 22 is in GDSII) or OASIS (if the library 22 is in OASIS) or so forth.

Thereafter, in an operation 24 instantiated standard cells and their placements are identified in the layout rendering of the IC-under-test 10 by matching the instantiated standard cells with corresponding as-fabricated standard cell layout renderings retrieved from the library 22 of as-fabricated standard cell layout renderings. With the instantiated standard cells and their placements identified, in an operation 26 the connectivity of the instantiated standard cells is determined using the layout image of the IC-under-test (or, in the illustrative example, using the layout rendering of the IC-under-test generated from the layout image of the IC-under-test which improves computational efficiency), and a netlist is generated for the IC-under-test 10 based on the instantiated standard cells and the connectivity. The netlist is typically a useful format for performing subsequent IC assessment operations such as design verification and/or validation 28. Optionally, a higher-level representation of the IC-under-test 10 may be generated from the netlist, such as a register-transfer level (RTL) representation in Verilog or VHDL, which may then be used (alone, or in combination with the netlist) in the subsequent IC assessment operations 28. Some nonlimiting illustrative examples of subsequent IC assessment operations 28 include: comparing the netlist output by the operation 24 against an intended design netlist for the IC-under-test 10 to identify any missing, substituted, and/or erroneously connected standard cells; identifying additional standard cells and/or additional connectivity of the netlist output by the operation 24 compared with the intended design netlist for the IC-under-test 10 to identify potentially deliberate insertion of malicious features into the fabricated IC-under-test 10; using the netlist output by the operation 24 to reverse-engineer the IC-under-test 10 for IC obsolescence remediation (e.g., in a case in which the IC-under-test is obsolete or otherwise no longer available, a replacement IC can be designed and fabricated in accordance with the netlist output by the operation 24); and/or so forth.

Typically, the standard cell layout renderings of the library of standard cell layout renderings 22 are rectilinear renderings generated by design software. For example, the standard cell layout renderings of the library 22 typically have regions of polyimide, silicon nitride, silicon oxide, or other materials with abrupt, straight edges defining rectangles with sharp edges and exact 90° corners, and electrical interconnects with straight sides having abrupt edges and sharp 90° turns. However, this precise rectilinear software-designed geometry is not faithfully replicated in the as-fabricated (i.e. instantiated) standard cells. Rather, limitations of physical fabrication processes such as optical diffraction during photolithography steps, undercutting or other nonidealities in etching steps, material diffusion occurring during layer deposition, and the like, leads to the as-fabricated (i.e. instantiated) standard cells having regions with more diffuse edges and rounded corners, interconnects with diffused edges and rounded rather than 90° turns, and so forth.

Notwithstanding the foregoing, in some embodiments the instantiated standard cells and their placements in the layout image of the IC-under-test 10 are identified by matching the instantiated standard cells in the layout image (or converted rendering) of the IC-under-test 10. This is indicated in FIG. 1 by a dashed arrow 30 indicating the standard cell layout renderings of the library 22 serve as input to the operation 24 in which the instantiated standard cells are identified. However, because the standard cell layout renderings of the library 22 are rectilinear; whereas, the layout image of the IC-under-test 10 (or the converted rendering of the layout image of the IC-under-test 10) have rounded corners, non-abrupt regional edges, et cetera as noted above, these differences can be expected to reduce the reliability of the matching performed in the operation 24 when using the library 22, which can lead to misidentified instantiated standard cells and/or failure to identify some instantiated standard cells.

With continuing reference to FIG. 1, in an improved approach, the instantiated standard cell identification of operation 24 instead identifies instantiated standard cells and their placements in the layout image of the IC-under-test 10 by matching the instantiated standard cells with corresponding as-fabricated standard cell layout renderings retrieved from a library 32 of as-fabricated standard cell layout renderings. This is indicated in FIG. 1 by the solid arrow 34 indicating that, for these embodiments, the as-fabricated standard cell layout renderings of the library 32 serve as input to the operation 24 in which the instantiated standard cells are identified. The library 32 of as-fabricated standard cell layout rendering is constructed using at least one reference layout image 40 acquired of a reference IC.

More particularly, with continuing reference to FIG. 1, a layout rendering 42 of the reference IC is also assumed to be available. This layout rendering may be the original GDSII layout generated in a typical design flow. An artificial intelligence (AI) component comprising at least one artificial neural network (ANN) is trained to transform layout rendering tiles 44 of the layout rendering 42 of the reference IC into corresponding reference layout image tiles 46 extracted from the at least one layout image 40 of the reference IC, so as to generate a trained AI component 50. Then, using the trained AI component 50, the standard cell layout renderings of the library 22 of standard cell layout renderings are transformed into the as-fabricated standard cell layout renderings forming the library 32 of as-fabricated standard cell layout renderings.

Figure 2:
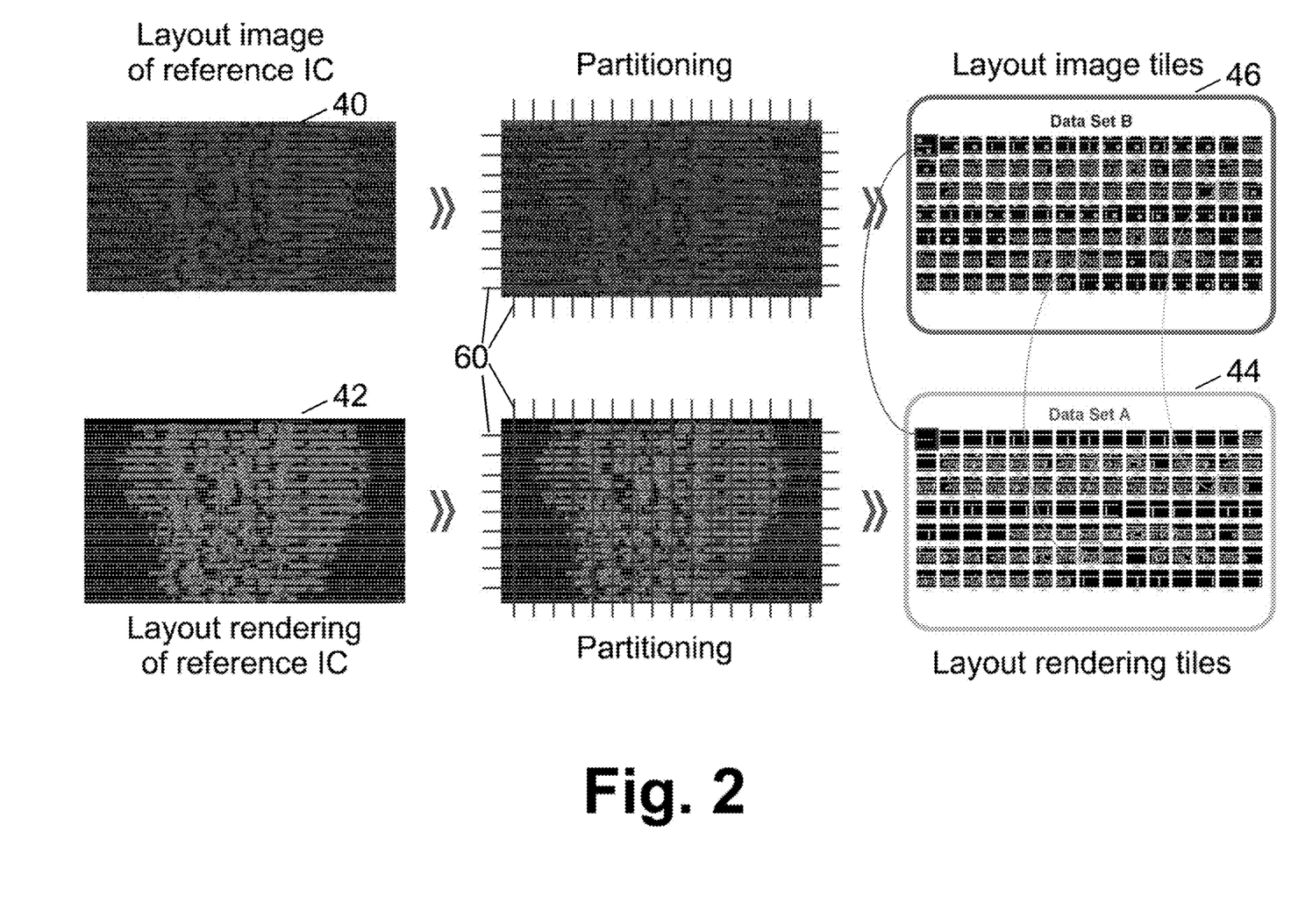
FIGS. 2 and 3 diagrammatically illustrate embodiments of the training data set generation aspect of the IC assessment system of FIG. 1.

More particularly, with particular reference to FIG. 2, the at least one reference layout image 40 is partitioned into the reference layout image tiles 46 using a tiling scheme 60, and the layout rendering 42 of the reference IC is partitioned into the layout rendering tiles 44 using the same tiling scheme 60 used in the partitioning of the at least one reference layout image 40. In this way, each layout rendering tile 44 has a corresponding reference layout image tile 46, and these form a training set 52 for use in training 54 the AI component as just described so as to generate the trained AI component 50.

Figure 3:
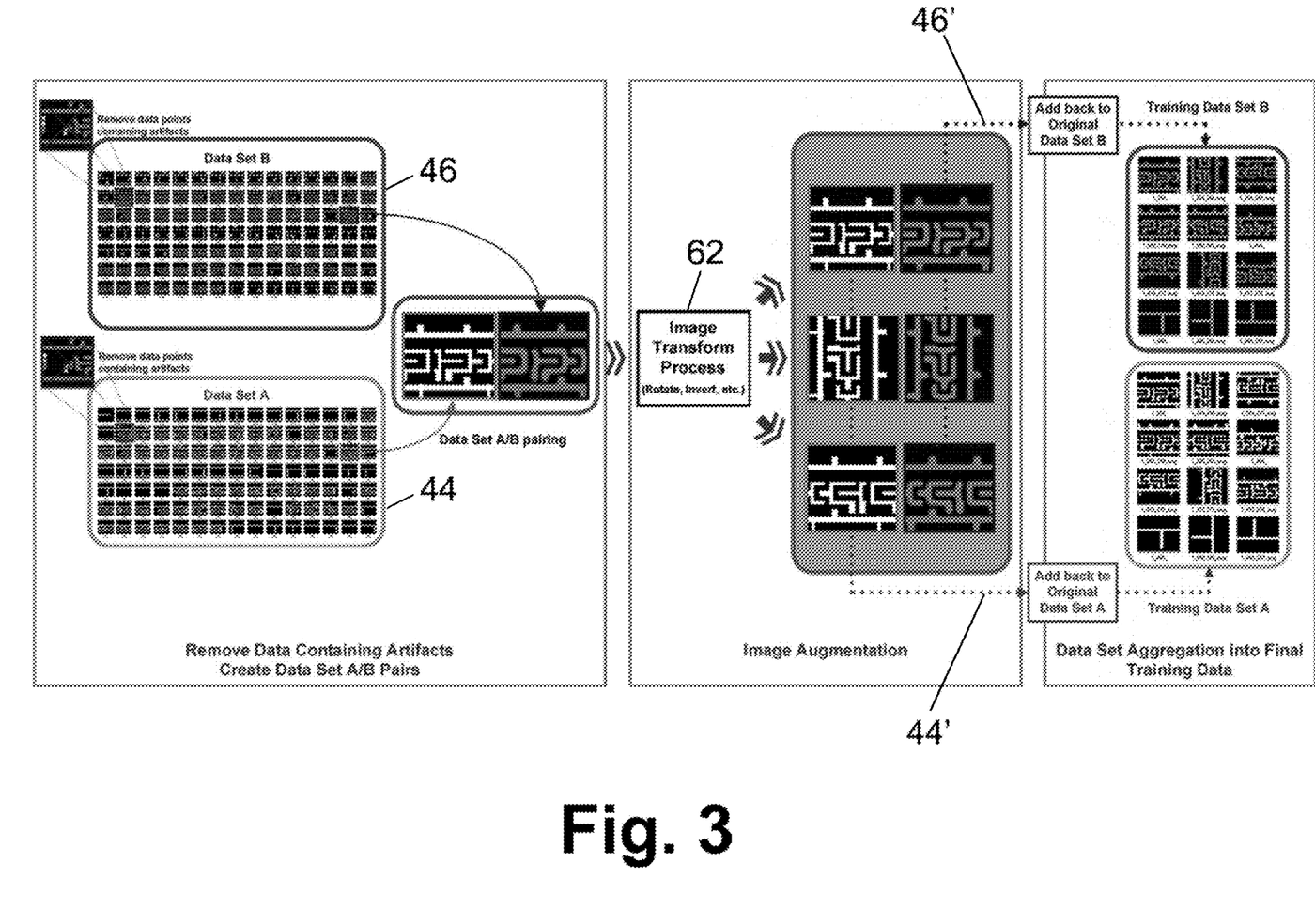

With particular reference to FIG. 3, in some embodiments, additional layout rendering tiles 44' and corresponding reference layout image tiles 46' forming the training set 52 used in the training 54 are generated by applying image transforms 62 including at least rotate image transforms and invert image transforms to the layout rendering tiles 44 and their corresponding reference layout image tiles 46 generated by the tiling operations 60 of FIG. 2.

Figure 4:
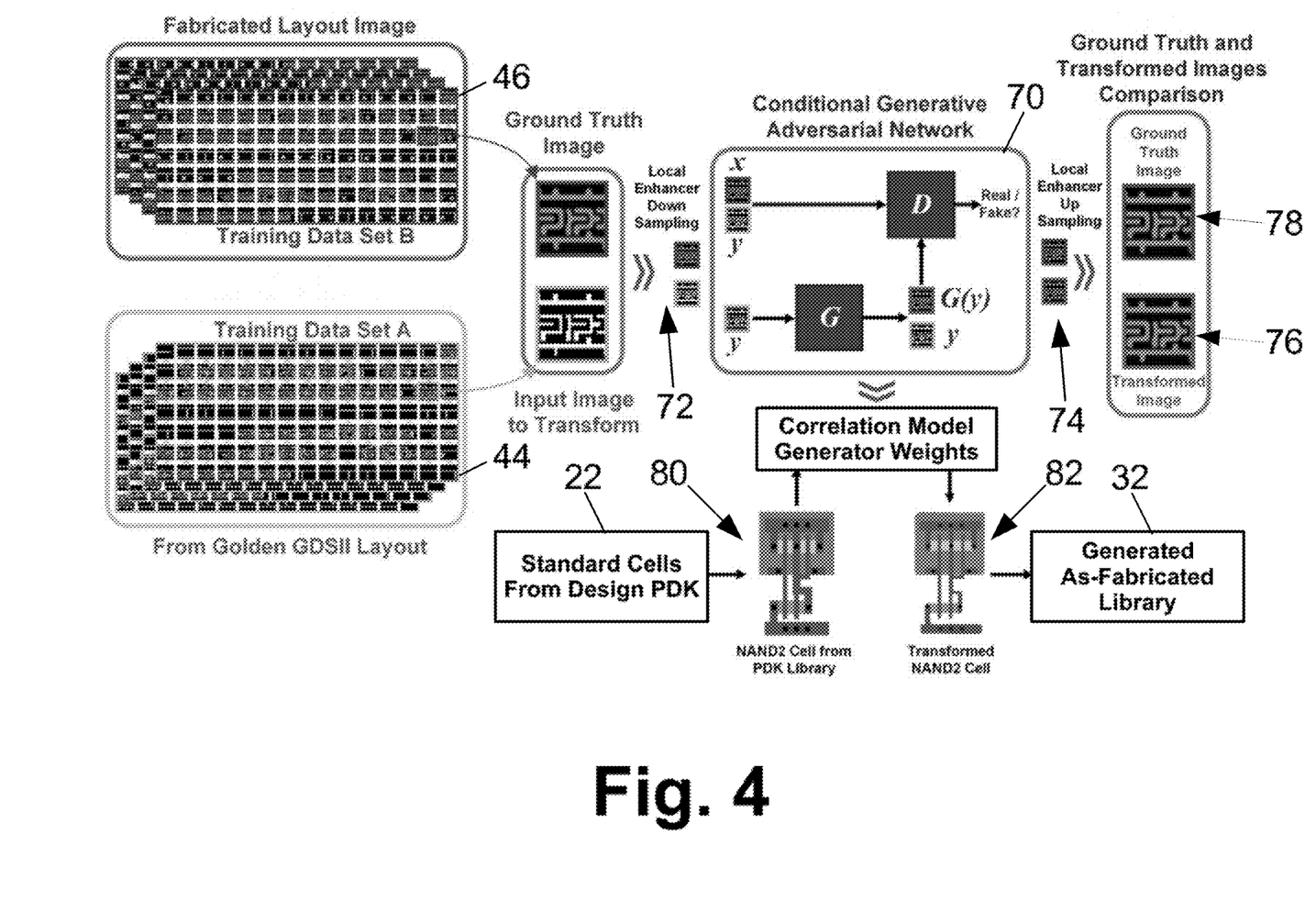
FIG. 4 diagrammatically illustrates an embodiment of the C-GAN training aspect of the IC assessment system of FIG. 1.

With particular reference to FIG. 4, in one illustrative embodiment the artificial intelligence (AI) component is a conditional generative adversarial network (C-GAN) 70 comprising a first artificial neural network (ANN) defining a generative network G and a second ANN defining a discriminative network D. Such C-GAN AI components are described, for example, in T.-C. Wang et al., "High-Resolution Image Synthesis and Semantic Manipulation with Conditional GANs," in IEEE/CVF Conference on Computer Vision and Pattern Recognition, Salt Lake City, UT, 2018; and Isola et al., "Image-to-Image Translation with Conditional Adversarial Networks," Berkeley AI Research Laboratory, 2017. Update equations for the training of the C-GAN 70 are shown in FIG. 4. In the illustrative C-GAN training example of FIG. 4, computational efficiency is enhanced by applying local enhancer downsampling 72 to the input layout rendering tiles 44 and their corresponding reference layout image tiles 46 prior to input to the C-GAN 70, and then applying local enhancer upsampling 74 to the output. The trained AI component 70 processes the layout rendering tile 44 to output a transformed layout rendering tile 76, and the training 54 optimizes weights of the at least one ANN of the AI component to optimize similarity of the transformed layout rendering tile to the "ground truth" image 78, i.e. the corresponding reference layout image tile. The resulting trained AI component 50 is then applied to transform the standard cell layout renderings 80 of the library 22 of standard cell layout renderings into the as-fabricated standard cell layout renderings 82 forming the library 32 of as-fabricated standard cell layout renderings.

Figure 5:
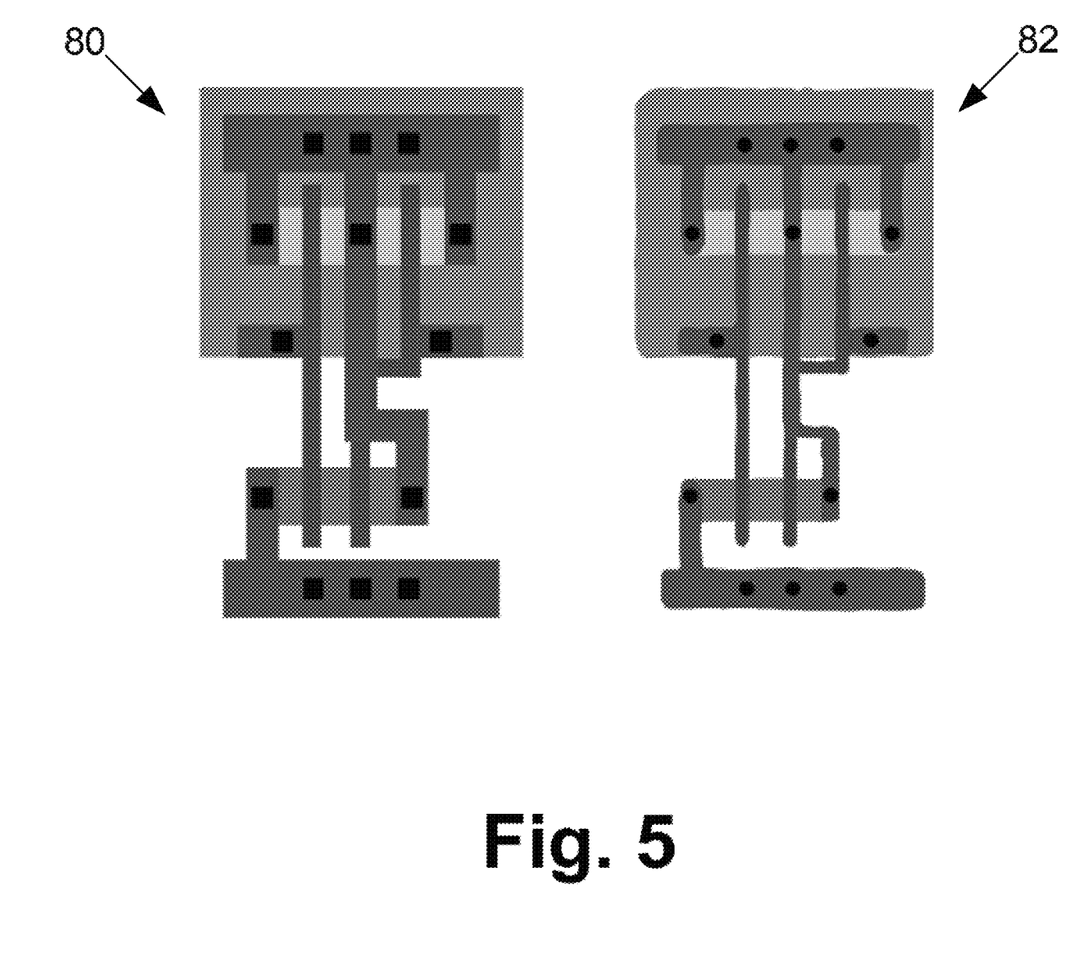
FIG. 5 diagrammatically illustrates the aspect of the IC assessment system of FIG. 1 in which the trained C-GAN is applied to generate the as-fabricated standard cell library from the design GDSII standard cell library.

With reference to FIG. 5, an illustrative example is shown of the operation of using the trained AI component 50 to transform a standard cell layout rendering 80 of a NAND logic gate of the library 22 of standard cell layout renderings into an as-fabricated standard cell layout rendering 82 of the NAND logic gate for inclusion in the library 32 of as-fabricated standard cell layout renderings. As seen in FIG. 5, the rectilinear features and sharp 90° angles of the standard cell layout rendering 80 are transformed to less rectilinear features with more gradual angles in the as-fabricated standard NAND cell layout rendering 82, and these transformed features more closely resemble the image of the actually fabricated NAND cell. It is noteworthy that the details of the feature changes introduced by the foundry depends on how the foundry does the fabrication, and hence will generally vary significantly from one foundry to another. For example, if an IC is manufactured at Foundry A, the as-fabricated cell will have differences that would be different from the same IC manufactured at Foundry B. Consequently, it is not sufficient to simply apply some filter that does a general transform to curve rectilinear edges, thin traces, and so forth. Rather, in embodiments disclosed herein a deep learning neural net such as the illustrative C-GAN 70 is trained to learn the nuances of a specific technology and the manufacturing process of a specific foundry in order to be able to generate an accurate as-fabricated cell library. In prior experiments it was found that the matching algorithm had to apply strong image softening to the standard (specifically, golden PDK library) cell layout rendering to accommodate the disparity between golden PDK library cells and the as-fabricated instantiation match. Strong softening is problematic for more advanced node libraries because there are subtle nuanced differences between cells. Thus, applying strong softening in the matching algorithm creates many false positives. By contrast, by using the as-fabricated library 32 constructed as disclosed herein, the cells are much closer to their instantiations, thus enabling the matching algorithm to be tightened (e.g. by using less or no softening) thereby making the match process more accurate than previously.

As previously noted, the approach described with reference to FIG. 1 for constructing the library 32 of as-fabricated standard cell layout renderings receives as input the layout image 40 of the reference IC, and a layout rendering 42 of the reference IC is also assumed to be available. This set of data 40, 42 may be obtained in various ways. In one approach, the layout rendering 42 of the reference IC is provided by a trusted semiconductor manufacturer, e.g. as a golden GDSII layout reference, along with providing the fabricated reference IC. In this case, the layout image 40 of the reference IC is obtained using the microscope 2. In another approach, the original design GDSII layout can be obtained from the designer who is sending out the GDSII to be fabricated. For example, the PDK library that is used to conduct the design is suitably received from the semiconductor manufacturer.

In the foregoing embodiments, the layout image of the IC-under-test is a 3D layout image formed by stacking a plurality of layer images of the IC-under-test acquired by the destructive delayering process 12, 14, 16, 18. This approach provides more detailed information which enhances robustness of the IC assessment, but at the cost of extensive, and destructive, processing of the device-under-test.

Figure 6:
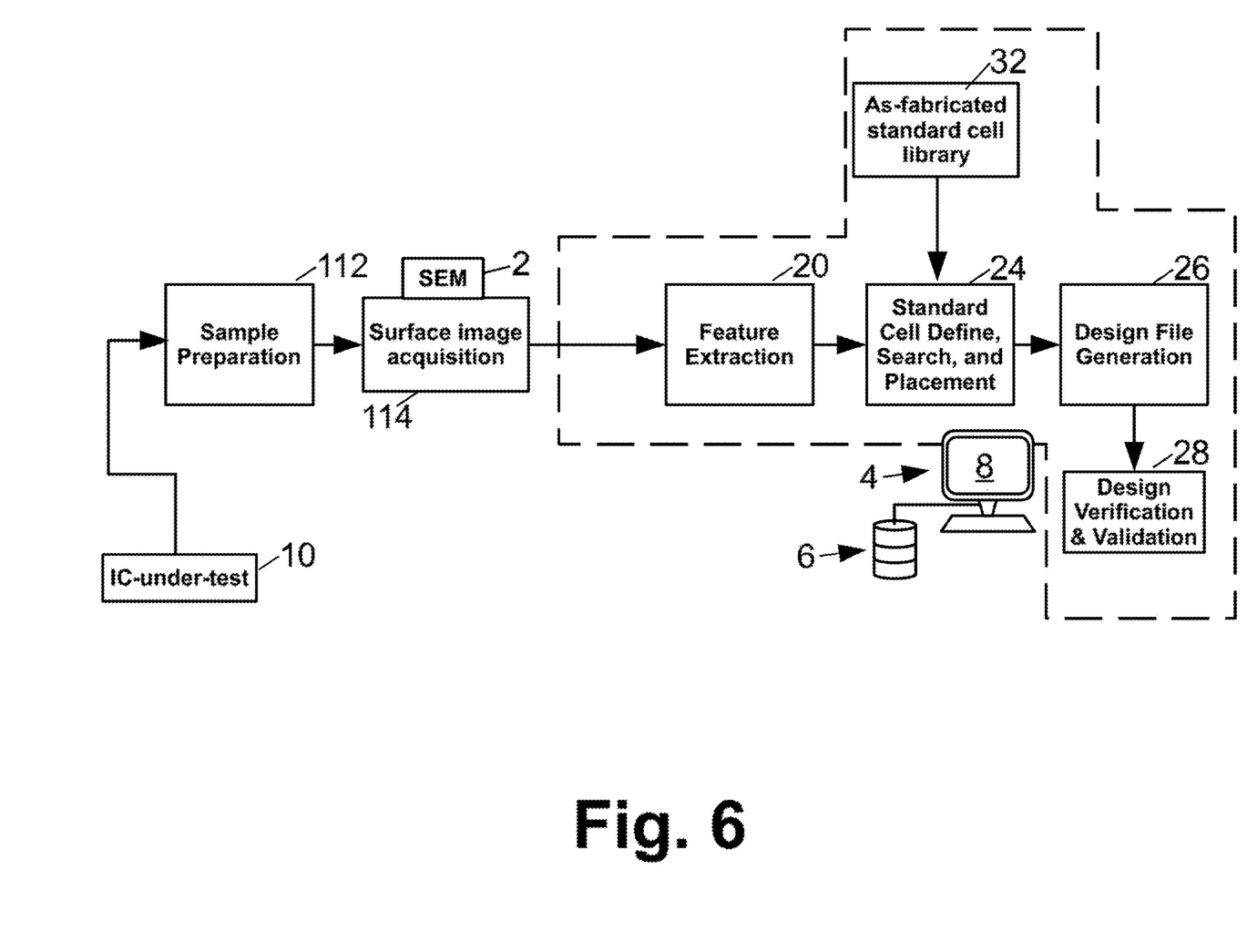
FIG. 6 diagrammatically illustrates a non-destructive IC assessment system using the as-fabricated standard cell library in matching and placing components of the IC undergoing assessment.

With reference now to FIG. 6, in a variant embodiment, the layout image of the IC-under-test is a 2D layout image acquired by a nondestructive process including sample preparation 112 and surface image acquisition 114. These operations are performed non-iteratively and do not involve delayering —hence, they are nondestructive and faster than the delayering process of FIG. 1. However, the resulting 2D layout image provides less information compared with the 3D layout image of the embodiments of FIG. 1. In the IC assessment device of FIG. 6, the electronic processor 4 performs the feature extraction 20 as previously described for the embodiments of FIG. 1, except being applied here to a 2D layout image. The operation 24 again applies the as-fabricated standard cell library 32. In the embodiment of FIG. 6, the as-fabricated standard cell library 32 was suitably constructed as described for FIG. 1, utilizing a reference IC which is different from the IC-under-test and for which a golden GDSII, OASIS, or other layout reference is available. The downstream operations 26, 28 are also performed as already described with reference to the embodiment of FIG. 1.

With reference to FIG. 1, it should be noted that the construction of the as-fabricated standard cell library 32 (corresponding to blocks 22, 40, 42, 44, 46, 50, 52, 54 of FIG. 1) on the one hand, and the IC-under-test processing (corresponding to blocks 10, 12, 14, 16, 18, 20, 24, 26, 28) may optionally be performed by different electronic processors. For example, in one such implementation, the semiconductor manufacturer may construct the as-fabricated standard cell library 32 (corresponding to blocks 22, 40, 42, 44, 46, 50, 52, 54 of FIG. 1) using a computer owned or controlled by the semiconductor manufacturer. The resulting as-fabricated standard cell library 32 is then specific to that semiconductor manufacturer (and possibly specific to a subset of fabrication lines run by that semiconductor manufacturer). The semiconductor manufacturer may then provide the as-fabricated standard cell library 32 to customers of the semiconductor manufacturer (e.g. supplied on an optical disk, or as a file or set of files downloadable from the manufacturer's server via the Internet). Thereafter, a customer of the semiconductor manufacturer can test fabricated ICs received from the semiconductor manufacturer (or some subset of the received ICs) by implementing the IC-under-test processing (corresponding to blocks 10, 12, 14, 16, 18, 20, 24, 26, 28) at a different computer which is owned or controlled by the customer. This latter implementation might, for example, correspond to a nondestructive assessment of an IC-under-test performed by the customer using the system of FIG. 6.

Furthermore, the illustrative examples employ the C-GAN 70 of FIG. 1 as the trained AI component 50 used in constructing the as-fabricated standard cell library 32. However, more generally other types of AAN-based AI components may be similarly trained to transform layout rendering tiles of a layout rendering of a reference IC into corresponding reference layout image tiles extracted from at least one layout image of the reference IC.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An integrated circuit (IC) assessment device for assessing an IC-under-test, the IC assessment device comprising:
   an electronic processor; and
   a non-transitory storage medium storing:
   a library of as-fabricated standard cell layout renderings constructed using at least one reference layout image acquired of a reference IC;
   instructions readable and executable by the electronic processor to perform an IC assessment method including identifying instantiated standard cells and their placements in the layout image of the IC-under-test by matching the instantiated standard cells with corresponding as-fabricated standard cell layout renderings retrieved from the library of as-fabricated standard cell layout renderings; and
   instructions readable and executable by the electronic processor to perform a method of constructing the library of as-fabricated standard cell layout renderings, the method including:
   training an artificial intelligence (AI) component comprising at least one artificial neural network (ANN) to transform layout rendering tiles of a layout rendering of a reference IC into corresponding reference layout image tiles extracted from at least one layout image of the reference IC; and
   using the trained AI component, transforming standard cell layout renderings of a library of standard cell layout renderings into the as-fabricated standard cell layout renderings forming the library of as-fabricated standard cell layout renderings.

2. The IC assessment device of claim 1 wherein the method of constructing the library of as-fabricated standard cell layout renderings further includes:
   partitioning the at least one reference layout image into the reference layout image tiles using a tiling scheme; and partitioning a layout rendering of the reference IC into the layout rendering tiles using the same tiling scheme used in the partitioning of the at least one reference layout image whereby each layout rendering tile has a corresponding reference layout image tile.

3. The IC assessment device of claim 2 wherein the method of constructing the library of as-fabricated standard cell layout renderings further includes generating additional layout rendering tiles and corresponding reference layout image tiles used in training the AI component by applying image transforms including at least rotate image transforms and invert image transforms to the layout rendering tiles and their corresponding reference layout image tiles generated by the tiling operations.

4. The IC assessment device of claim 1 wherein the AI component comprises a Conditional Generative Adversarial Network (C-GAN).

5. The IC assessment device of claim 1 wherein:
the layout rendering of the reference IC is a GDSII or Open Artwork System Interchange Standard (OASIS) layout rendering of the reference IC,
the standard cell layout renderings of the library of standard cell layout renderings are GDSII or OASIS standard cell layout renderings, and
the as-fabricated standard cell layout renderings forming the library of as-fabricated standard cell layout renderings are GDSII or OASIS as-fabricated standard cell layout renderings.

6. The IC assessment device of claim 5 wherein the IC assessment method further includes:
converting the layout image of the IC-under-test to a GDSII or OASIS layout rendering of the IC-under-test;
wherein the identifying of the instantiated standard cells and their placements in the layout image of the IC-under-test includes matching the instantiated standard cells in the GDSII or OASIS layout rendering of the IC-under-test with corresponding GDSII or OASIS as-fabricated standard cell layout renderings retrieved from the library of as-fabricated standard cell layout renderings.

7. The IC assessment device of claim 1 wherein the reference IC is the IC-under-test, and the non-transitory storage medium further stores instructions readable and executable by the electronic processor to generate the layout rendering of the reference IC by operations including:
identifying instantiated standard cells and their placements in the at least one reference layout image by matching the instantiated standard cells with corresponding standard cell layout renderings of the library of standard cell layout renderings; and
combining the standard cell layout renderings corresponding to the instantiated standard cells in accord with the placements of the instantiated standard cells to generate the layout rendering of the reference IC.

8. The IC assessment device of claim 1 wherein the layout image of the IC-under-test comprises a two-dimensional (2D) layout image acquired by a nondestructive process or a three-dimensional (3D) layout image formed by stacking a plurality of layer images of the IC-under-test acquired by a destructive delayering process.

9. The IC assessment device of claim 1 wherein the IC assessment method further includes:
determining connectivity of the instantiated standard cells using the layout image of the IC-under-test or a layout rendering of the IC-under-test generated from the layout image of the IC-under-test; and
generating a netlist for the IC-under-test based on the instantiated standard cells and the connectivity.

10. The IC assessment device of claim 1 further comprising:
a microscope configured to acquire the layout image of the IC-under-test.

11. A non-transitory storage medium storing instructions readable and executable by an electronic processor to perform a method of constructing a library of as-fabricated standard cell layout renderings, the method including:
training an artificial intelligence (AI) component comprising at least one artificial neural network (ANN) to transform layout rendering tiles of a layout rendering of a reference IC into corresponding reference layout image tiles extracted from at least one layout image of the reference IC; and
using the trained AI component, transforming standard cell layout renderings of a library of standard cell layout renderings into the as-fabricated standard cell layout renderings forming the library of as-fabricated standard cell layout renderings.

12. The non-transitory storage medium of claim 11 wherein the method of constructing the library of as-fabricated standard cell layout renderings further includes:
partitioning the at least one reference layout image into the reference layout image tiles using a tiling scheme;
partitioning a layout rendering of the reference IC into the layout rendering tiles using the same tiling scheme used in the partitioning of the at least one reference layout image whereby each layout rendering tile has a corresponding reference layout image tile.

13. The non-transitory storage medium of claim 11 wherein the non-transitory storage medium further stores instructions readable and executable by an electronic processor to perform an IC assessment method including:
converting a layout image of the IC-under-test to a layout rendering of the IC-under-test; and
identifying instantiated standard cells and their placements in the IC-under-test by matching instantiated standard cells in the layout rendering of the IC-under-test with corresponding as-fabricated standard cell layout renderings retrieved from the library of as-fabricated standard cell layout renderings.

14. The non-transitory storage medium of claim 13 wherein the IC assessment method further includes:
determining connectivity of the instantiated standard cells using the layout rendering of the IC-under-test; and
generating a netlist for the IC-under-test based on the instantiated standard cells and the connectivity.

15. The non-transitory storage medium of claim 13 wherein:
the layout rendering of the reference IC is a GDSII or Open Artwork System Interchange Standard (OASIS) layout rendering of the reference IC,
the standard cell layout renderings of the library of standard cell layout renderings are GDSII or OASIS standard cell layout renderings,
the as-fabricated standard cell layout renderings forming the library of as-fabricated standard cell layout renderings are GDSII or OASIS as-fabricated standard cell layout renderings, and
the layout rendering of the IC-under-test is a GDSII or OASIS layout rendering of the IC-under-test.

16. The non-transitory storage medium of claim 13 wherein the layout image of the IC-under-test comprises one of:

(i) a two-dimensional (2D) layout image acquired by a nondestructive process, or
(ii) a three-dimensional (3D) layout image formed by stacking a plurality of layer images of the IC-under-test acquired in conjunction with a destructive delayering process.

17. An integrated circuit (IC) assessment method for assessing an IC-under-test, the IC assessment method comprising
  training an artificial intelligence (AI) component comprising at least one artificial neural network (ANN) to transform layout rendering tiles of a GDSII or OASIS rendering of a reference IC into corresponding reference layout image tiles extracted from at least one layout image of the reference IC;
  using the trained AI component, transforming GDSII or OASIS standard cell layout renderings of a library of GDSII or OASIS standard cell layout renderings into as-fabricated standard cell layout renderings forming a library of as-fabricated standard cell layout renderings; and
  identifying instantiated standard cells and their placements in the layout image of the IC-under-test by matching the instantiated standard cells with corresponding as-fabricated standard cell layout renderings retrieved from the library of as-fabricated standard cell layout renderings.

18. The method of claim 17 wherein the identifying further includes:
  converting the layout image of the IC-under-test to a layout rendering of the IC-under-test; and
  identifying the instantiated standard cells and their placements in the layout image of the IC-under-test by matching the instantiated standard cells in the converted layout rendering of the IC-under-test with the corresponding as-fabricated standard cell layout renderings retrieved from the library of as-fabricated standard cell layout renderings.

19. The method of claim 17 further comprising:
  determining connectivity of the instantiated standard cells using the layout image of the IC-under-test or a layout rendering of the IC-under-test generated from the layout image of the IC-under-test; and
  generating a netlist for the IC-under-test based on the instantiated standard cells and the connectivity.

* * * * *